(12) United States Patent
Murai

(10) Patent No.: US 6,777,897 B2
(45) Date of Patent: Aug. 17, 2004

(54) MOTOR CONTROL APPARATUS AND MOTOR CONTROL METHOD

(75) Inventor: Hiroaki Murai, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 1 day.

(21) Appl. No.: 10/366,399

(22) Filed: Feb. 14, 2003

(65) Prior Publication Data

US 2003/0155878 A1 Aug. 21, 2003

(30) Foreign Application Priority Data

Feb. 18, 2002 (JP) ........................................ 2002-040269

(51) Int. Cl.$^7$ .............................. H02P 7/63; H02P 5/28; G06F 15/00
(52) U.S. Cl. ...................... 318/138; 318/254; 318/701; 318/721; 318/799; 702/189; 702/183
(58) Field of Search ................................. 318/138, 254, 318/439, 701, 721, 798, 799; 702/189, 183; 60/274, 276

(56) References Cited

U.S. PATENT DOCUMENTS

| | | | | |
|---|---|---|---|---|
| 4,008,421 A | * | 2/1977 | Bird | 318/722 |
| 5,119,629 A | * | 6/1992 | Kume et al. | 60/274 |
| 5,760,359 A | * | 6/1998 | Nakano et al. | 318/603 |
| 6,121,736 A | * | 9/2000 | Narazaki et al. | 318/254 |
| 6,388,416 B1 | * | 5/2002 | Nakatani et al. | 318/700 |
| 6,389,373 B1 | * | 5/2002 | Ohya | 702/189 |
| 6,541,939 B2 | * | 4/2003 | Kishibe et al. | 318/799 |

FOREIGN PATENT DOCUMENTS

JP 11-285288 A 10/1999

* cited by examiner

*Primary Examiner*—Paul Ip
(74) *Attorney, Agent, or Firm*—Foley & Lardner LLP (57) ABSTRACT

When a switch between sine wave voltage drive and rectangular wave voltage drive is effected based upon the motor rotation speed and a motor torque command value, an AC voltage forming an intermediate wave is generated by combining the sine wave and the rectangular wave and is applied to the motor.

11 Claims, 7 Drawing Sheets

MOTOR CONTROL APPARATUS AND MOTOR CONTROL METHOD

BACKGROUND OF THE INVENTION

1. Field of the Invention

The present invention relates to a motor control apparatus and a motor control method.

2. Description of the Related Art

There are motor control apparatuses known in the related art that normally implement sine wave PWM (pulse width modulation) control so as to achieve higher motor efficiency and implement rectangular wave control in a high-speed, high-torque range over which the sine wave PWM control cannot be implemented with ease. Such motor control apparatuses include one that achieves a continuous switch between the sine wave PWM control and the rectangular wave control by regarding the rectangular wave as a sine wave with an infinite amplitude and by simultaneously changing the phase and the amplitude in order to reduce the extent of the torque fluctuation occurring when switching between the sine wave and the rectangular wave control (see Japanese Laid-Open Patent Publication No. H11-285288).

SUMMARY OF THE INVENTION

However, when the operation is switched from the sine wave PWM control to the rectangular wave control or from the rectangular wave control to the sine wave PWM control in the motor control apparatus in the related art described above, the motor current does not change seamlessly, causing fluctuation in the rotation speed and the torque of the motor. If a fluctuation of the motor current, the motor rotation speed or the source voltage occurs at the time of the control switch, a trailing delay occurs as a result of the fluctuation.

It would be desirable to provide a motor control apparatus and a motor control method that achieve a smooth switch between the sine wave control and the rectangular wave control.

A motor control apparatus according to the present invention comprises a sine wave voltage drive device that generates a sine wave AC voltage and applies the sine wave AC voltage to a motor, a rectangular wave voltage drive device that generates a rectangular wave AC voltage and applies the rectangular wave AC voltage to the motor, a speed detection device that detects a rotation speed of the motor, a control switching device that switches to either the sine wave voltage drive device or the rectangular wave voltage drive device based upon the motor rotation speed and a torque command value and an intermediate wave voltage drive device that generates an AC voltage forming an intermediate wave achieved by combining a sine wave and a rectangular wave and applies the intermediate wave AC voltage to the motor when a switch between the sine wave voltage drive device and the rectangular wave voltage drive device is effected by the control switching device.

A motor control apparatus according to the present invention comprises a speed detection device that detects a rotation speed of a motor, an intermediate wave synthesizing device that generates an intermediate wave by combining a sine wave and a rectangular wave so as to set a rectangular wave component contained in the intermediate wave to 0 when the motor rotation speed and a torque command value are within a specific range and to increase the rectangular wave component contained in the intermediate wave as the motor rotation speed increases and also as the motor torque command value becomes higher when the motor rotation speed and the torque command value are outside the specific range and a drive device that controls an inverter by using the intermediate wave synthesized at the intermediate wave synthesizing device and applies and AC voltage achieving a waveform of the intermediate wave to the motor.

A motor control apparatus according to the present invention comprises a sine wave voltage generating device that implements PWM control based upon a modulation triangular-wave voltage and a sine-wave control voltage, controls an inverter by calculating a PWM control duty command value and generates an equivalent sine wave AC voltage to be applied to a motor, a rectangular wave voltage generating device that generates a rectangular wave AC voltage to be applied to the motor by controlling the inverter, a speed detection device that detects a rotation speed of the motor, a threshold value setting device that sets a PWM control duty threshold value in correspondence to the rotation speed and a motor torque command value and a control switching device that implements control so as to apply the equivalent sine wave AC voltage to the motor when the PWM control duty command value does not exceed the threshold value and to apply the rectangular wave AC voltage to the motor when the PWM control duty command value exceeds the threshold value.

A method of motor control achieved by selecting either a sine wave AC voltage or a rectangular wave AC voltage to be applied to a motor comprises generating an AC voltage forming an intermediate wave by combining a sine wave and a rectangular wave and applying the AC voltage forming an intermediate wave to the motor when a switch between the sine wave AC voltage and the rectangular wave AC voltage occurs.

DETAILED DESCRIPTION OF THE PREFERRED EMBODIMENT

The method of switching between sine wave PWM control and rectangular wave control adopted in an embodiment is explained. The motor control apparatus according to the present invention in the embodiment implements the sine wave PWM control to achieve higher motor efficiency under normal circumstances and implements the rectangular wave control in the high-speed, high-torque range over which the sine wave PWM control cannot be implemented with ease.

Figure 1A:
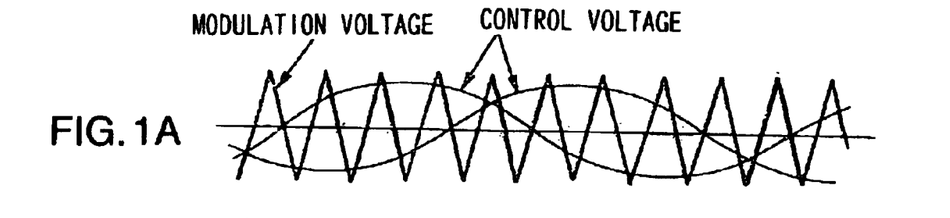
FIGS. 1A–1D illustrate a method for generating the U-V phase line voltage to be applied to a 3-phase AC motor in sine wave PWM control.
Figure 1B:
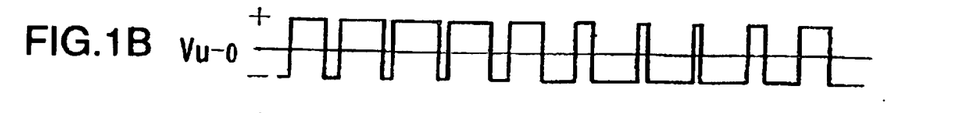
Figure 1C:
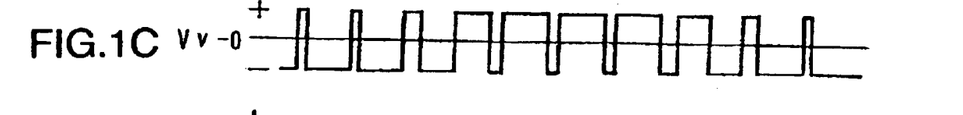
Figure 1D:
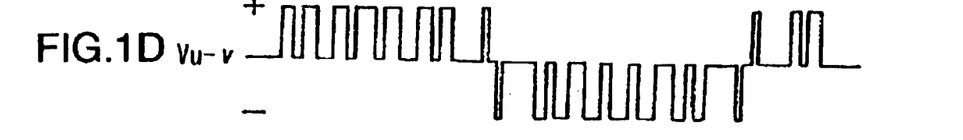

FIGS. 1A~1D illustrate the method adopted to generate a U-V phase line voltage to be applied to a 3-phase AC motor. As shown in FIG. 1A, a triangular-wave voltage for modulation and a sine-wave control voltage with an inverter frequency are compared with each other and, based upon the relationship between the levels of the two voltages, the voltage Vu-0 between an inverter U-phase output terminal and a virtual middle point shown in FIG. 1B and the voltage Vv-0 between an inverter V-phase terminal and the virtual middle point shown in FIG. 1C are generated. Then, the U-V phase line voltage Vu-v shown in FIG. 1D is generated by ascertaining the difference between the U-phase middle point voltage Vu-0 and the V-phase middle point voltage Vv-0. Since the method of generating the 3-phase line voltage Vu-v in the sine wave PWM control is of the known art, its detailed explanation is omitted. In addition, since a V-W phase line voltage Vv-w and a W-U phase line voltage Vw-u are generated in a similar manner, an illustration and an explanation of the method for generating these voltages are omitted as well.

When generating the line voltages Vu-v, Vv-w and Vw-u in the sine wave PWM control, patterns formed by the modulation triangular wave voltage and the U, V and W-phase sine-wave control voltages are stored in memory as numerical values and duty command values of the line voltages Vu-v, Vv-w and Vw-u manifesting in a pulse string form are each generated by comparing two sets of numerical data with a microcomputer. The duty ratio of the waveform of a given pulse form line voltage generated through this sine wave PWM control, i.e., the ratio of the voltage output period relative to a single cycle of the line voltage wave form ranges over a 0%~100% range in correspondence to the change in the sine-wave control voltage.

An application of a line voltage waveform with a pulse string form such as that shown in FIG. 1D achieved through the sine wave PWM control to a motor is equivalent to an application of a sine wave voltage to the motor. Namely, when the line voltage with the waveform shown in FIG. 1D is applied, a sine AC current flows through the motor.

Figure 2:
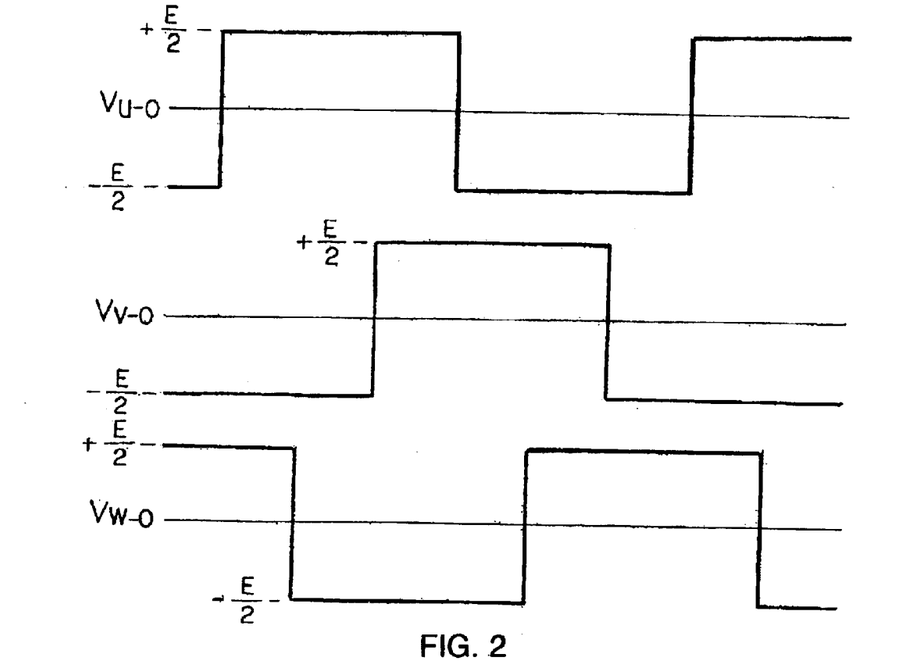
FIG. 2 shows the U-phase voltage, V-phase voltage, W-phase voltage supplied to a 3-phase AC motor in rectangular wave control.

FIG. 2 shows the U-phase voltage Vu-0, V-phase voltage Vv-0, W-phase voltage Vw-0 applied to the 3-phase AC motor in rectangular wave control. In the rectangular wave control, the individual phase voltages each alternating between a positive level and a negative level over every 180° (in the electrical angle) are applied to the 3-phase AC motor by an inverter.

Figure 3:
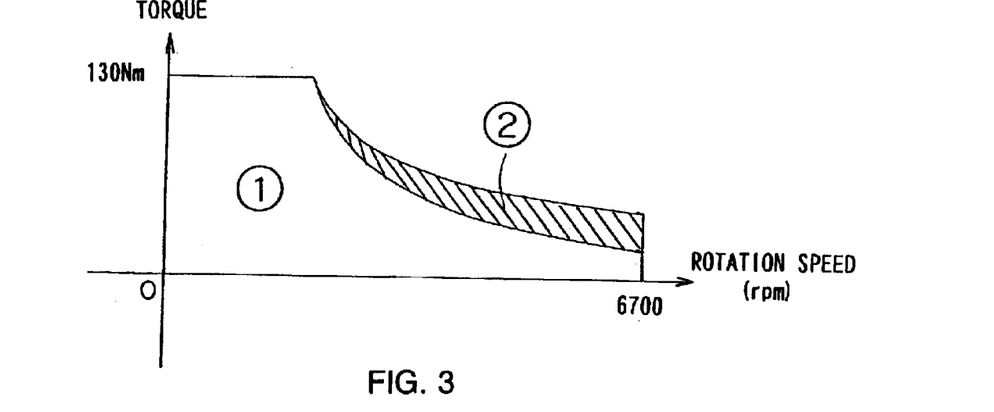
FIG. 3 shows a sine wave PWM control range, a rectangular wave control range and a control range over which control is implemented by using an intermediate wave composed of the sine wave and the rectangular wave.

FIG. 3 shows the various motor control ranges, as defined by the motor rotation speed and the motor torque, that include the sine wave PWM control range, the rectangular wave control range and the intermediate wave control range. The upper limit of the motor rotation speed is 6700 (rpm) and the torque upper limit is 130 (Nm). In the range ① over which the motor rotation speed and the motor torque are both low, sine wave PWM control is implemented so as to achieve higher efficiency. In the high-speed, high-torque range ② (the shaded area in FIG. 3) over which the sine wave PWM control cannot be implemented with ease, on the other hand, rectangular wave control or control that uses an intermediate wave (to be detailed later) composed of the sine wave and the rectangular wave is implemented.

Figure 4A:
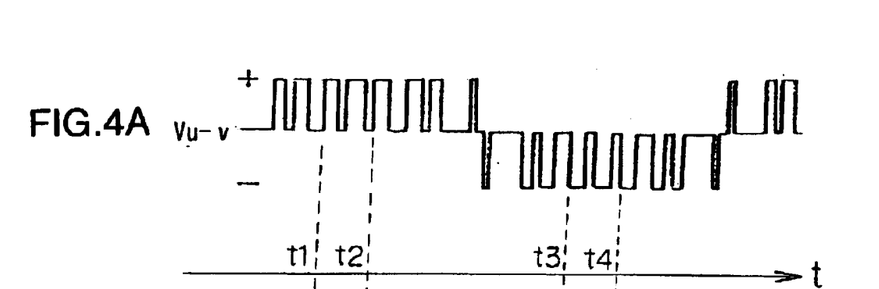
FIGS. 4A and 4B show a method for generating an intermediate wave based upon a sine wave and a rectangular wave.
Figure 4B:
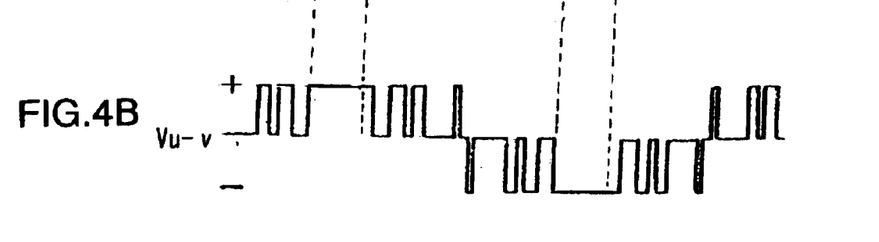

FIGS. 4A and 4B illustrate a method for generating an intermediate wave having a synthesized waveform achieved by combining the waveforms of the sine wave and the rectangular wave. As explained earlier, a line voltage applied to the motor is generated based upon the relationship between the levels of the modulation triangular-wave voltage and the corresponding sine-wave control voltage and the duty ratio of the line voltage with the pulse string waveform, i.e., the ratio of the voltage output period relative to a single cycle of the line voltage waveform, changes over a 0%~100% range, as shown in FIG. 4A. When the source voltage is seamlessly applied to the motor without switching the inverter during the period over which the duty ratio of the sine wave PWM control exceeds the positive-side threshold value THU and the period over which the duty ratio is under the negative-side threshold value THL, the U-phase line voltage waveform is shown in FIG. 4B.

In the example presented in FIGS. 4A and 4B, the inverter is not switched and a voltage +E/2 (E indicates the source voltage) is seamlessly output during a period t1~t2 over which the duty ratio is higher than the threshold value THU. Likewise, the inverter is not switched and a voltage −E/2 is seamlessly output during a period t3~t4 over which the duty ratio is lower than the negative-side threshold value THL.

Figure 5:
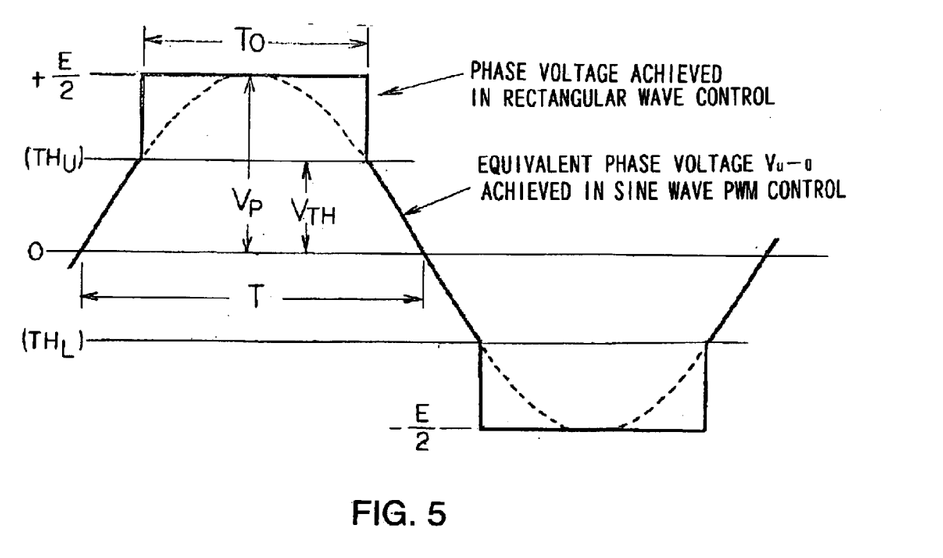
FIG. 5 provides an illustration which facilitates an explanation of the rectangular wave conversion rate.

In the sine wave PWM control, by seamlessly outputting the source voltage without switching the inverter only during the period over which the PWM duty ratio is higher than the positive threshold value THU or lower than the negative threshold value THL, a phase voltage equivalent to that shown in FIG. 5 is applied to the motor. In FIG. 5, an equivalent sine wave U-phase voltage Vu-0 is applied to the motor while the PWM duty ratio achieved in the sine wave PWM control is between the positive threshold value THU and the negative threshold value THL. However, while the PWM duty ratio is higher than the positive threshold THU or lower than the negative threshold value THL, the source voltage +E/2 or −E/2 is output seamlessly and thus, a rectangular-wave line voltage is applied to the motor. It is to be noted that while FIG. 5 shows the equivalent voltage to the U-phase voltage alone, similar line voltages are achieved at the V-phase and the W-phase as well.

Namely, in the motor control apparatus achieved in the embodiment, a voltage forming a synthesized intermediate wave which is a combination of a sine wave and a rectangular wave achieved by converting a part of the sine wave voltage used in the sine wave PWM control to a rectangular wave voltage, is applied to the motor. The "rectangular wave conversion rate" is defined as in the formula presented below based upon the peak value VP (see the dotted line) of the waveform of the equivalent U-phase voltage Vu-0 and the equivalent phase voltage VTH achieved when the PWM duty ratio is equal to the threshold value THU, shown in FIG. 5. It is to be noted that while the waveform peak value VP (see the dotted line) of the equivalent phase voltage Vu-0 achieved in the sine wave PWM control and the peak value +E/2 achieved in the rectangular wave control are equal to each other in FIG. 5, the peak value VP of the equivalent phase voltage Vu-0 in the sine wave PWM control changes in correspondence to the motor rotation speed and the motor torque and thus, the two peak values do not always match.

(rectangular wave conversion rate)=$(VP-VTH)/VP \times 100\%$

A line voltage with a waveform more closely resembling a sine waveform is applied to the motor as the rectangular wave conversion rate becomes lower, whereas a line voltage with a waveform more closely resembling a rectangular wave form is applied to the motor as the rectangular wave conversion rate becomes higher. It is to be noted that the rectangular wave conversion rate may instead be defined as the ratio (T0/T×100%) of the rectangular wave period T0 relative to a half cycle T of the equivalent phase voltage Vu-0.

Figure 6:
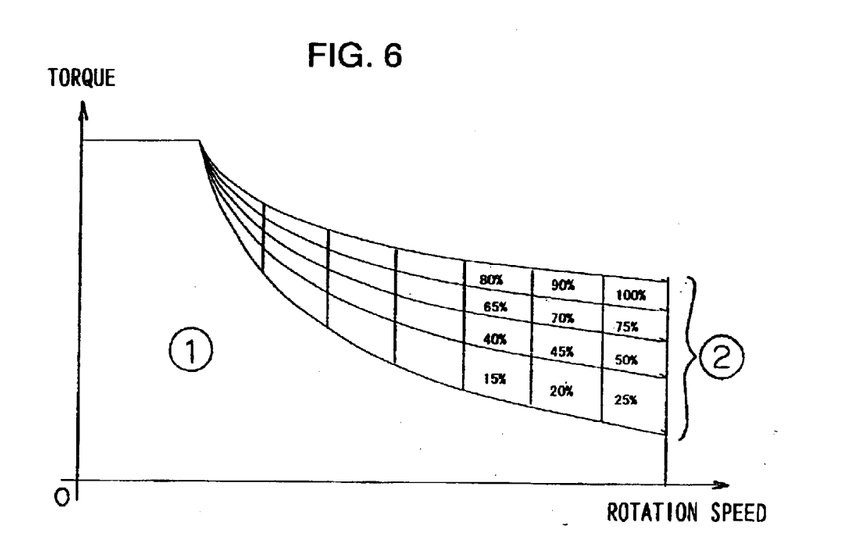
FIG. 6 presents a map of the rectangular wave conversion rate that varies in correspondence to the rotation speed and the torque of the motor.

In the motor control apparatus in the embodiment, the rectangular wave conversion rate is set in correspondence to the motor rotation speed and the motor torque. FIG. 6 shows an example in which the rectangular wave conversion rate is set in correspondence to the rotation speed and the torque of the motor. In this example, the rectangular wave conversion rate is set higher as the motor rotation speed becomes higher and also as the motor torque increases. It is to be noted that within the control range ② over which the control is implemented with the rectangular wave and the intermediate wave, the range with the rectangular wave conversion rate at 100% alone is the rectangular wave control range and the range with the rectangular wave conversion rate exceeding 0% and less than 100% is the intermediate control range in this example. In the intermediate wave control range, the positive and negative threshold values THU and THL of the PWM duty ratio are adjusted so that the rectangular wave conversion rate matches the conversion rate shown in FIG. 6, which is set in correspondence to the motor rotation speed and the motor torque.

Figure 7:
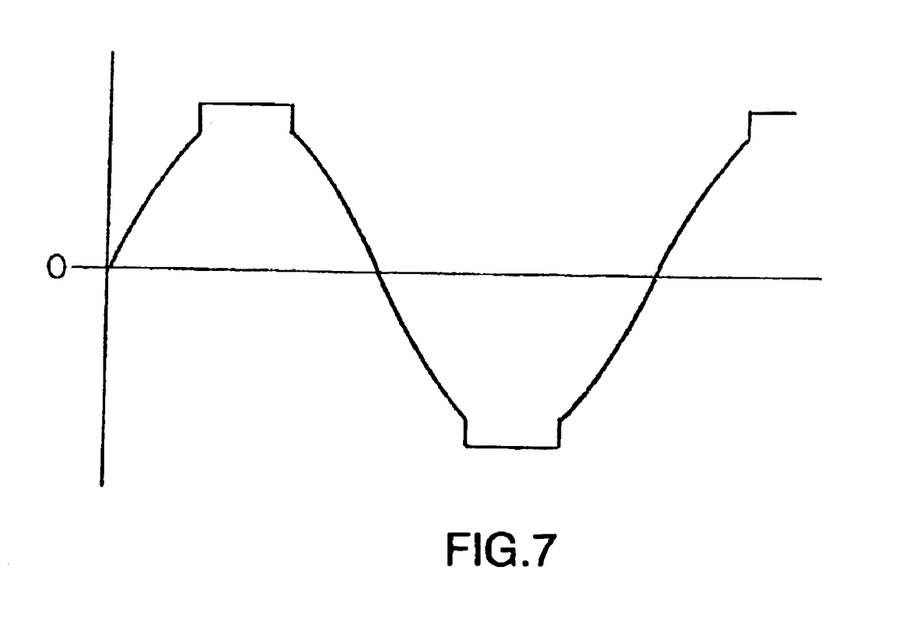
FIG. 7 shows the wave form of the U-phase equivalent voltage manifesting when the rectangular wave conversion rate is 15%.
Figure 8:
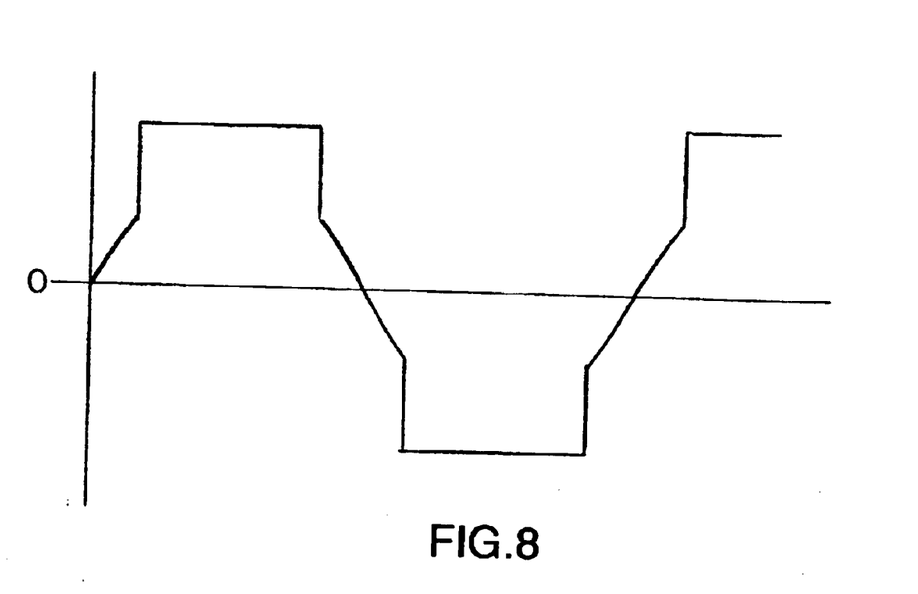
FIG. 8 shows the wave form of the U-phase equivalent voltage manifesting when the rectangular wave conversion rate is 65%.

FIG. 7 shows the waveform of the U-phase equivalent voltage achieved when the rectangular wave conversion rate is 15%, whereas FIG. 8 shows the waveform of the U-phase equivalent voltage achieved when the rectangular wave conversion rate is 65%. As FIGS. 7 and 8 indicate, the portion corresponding to the rectangular wave increases as the rectangular wave conversion rate becomes higher. It is to be noted that the waveforms of the V-phase voltage and the W-phase voltage are identical to the U-phase waveform except that their phases are offset by 120°.

Figure 9:
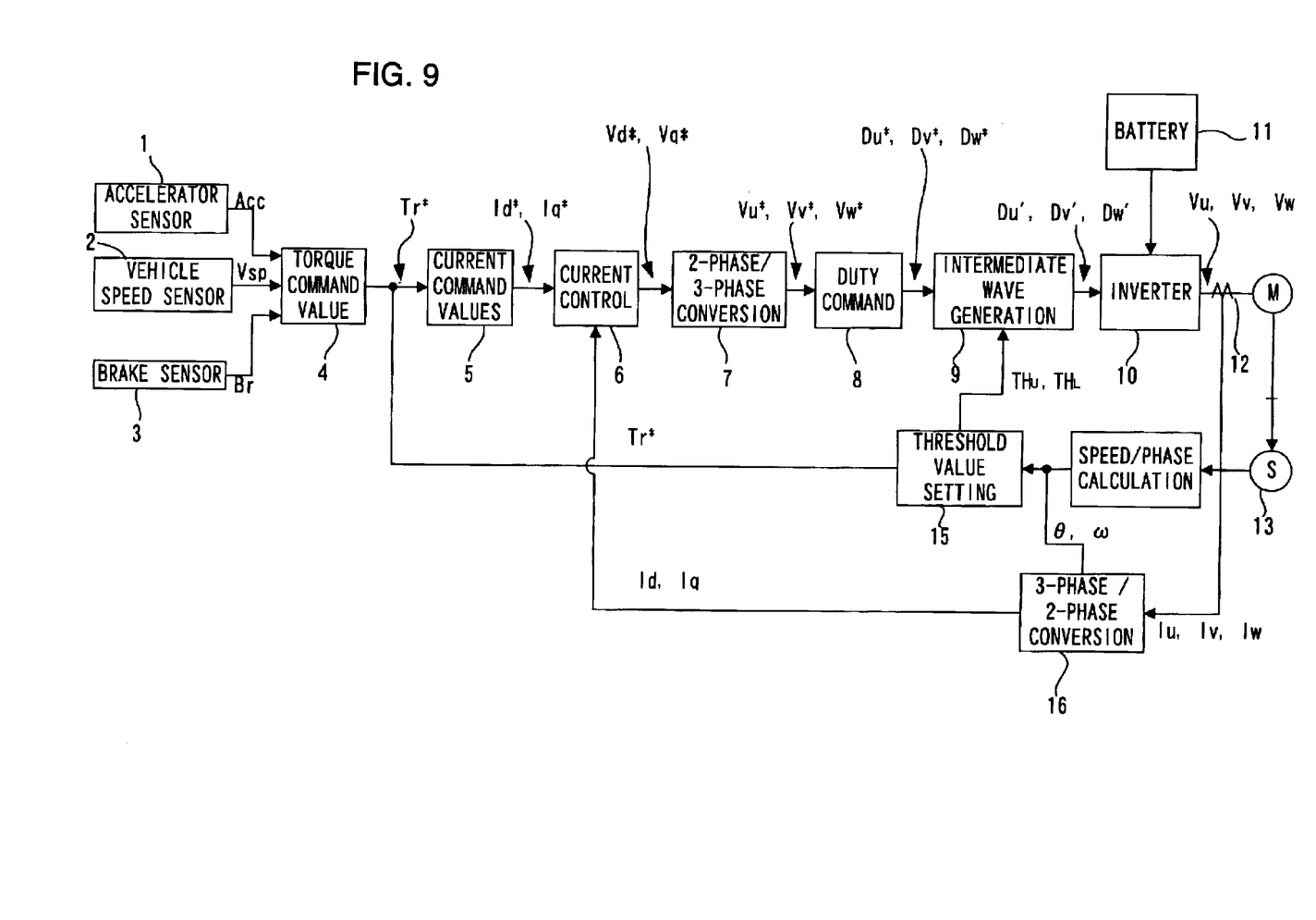
FIG. 9 shows the structure adopted in the motor control apparatus achieved in an embodiment.

FIG. 9 shows the structure achieved in an embodiment in which the present invention is adopted in a motor control apparatus for an electric car. An accelerator sensor 1 detects the extent Acc to which the accelerator pedal is depressed and a vehicle speed sensor 2 detects a traveling speed Vsp of the electric car. In addition, a brake sensor 3 detects the extent Br to which the brake pedal is depressed. A torque command value generating circuit 4 stores in memory a table of a torque command value that varies in correspondence to the accelerator pedal depression extent, the brake pedal depression extent and the traveling speed set in advance and calculates a torque command value Tr* corresponding to the detection values Acc, Vsp and Br provided by the accelerator sensor 1, the vehicle speed sensor 2 and the brake sensor 3 by referencing this table.

A current command value generating circuit 5 stores in memory a table of dq-axis current command values that vary in correspondence to a torque command value set in advance and calculates a d-axis current command value Id* and a q-axis current command value Iq* corresponding to the torque command value Tr* calculated at the torque command value generating circuit 4 by referencing the table. A current control circuit 6 ascertains the deviations of actual d-axis current Id and q-axis current Iq flowing through the motor M relative to the d-axis current command value Id* and the q-axis current command value Iq* calculated at the current command value generating circuit 5 and then calculates a d-axis voltage command value Vd* and a q-axis voltage command value Vq* through PT control implemented on the deviations. These voltage command values Vd* and Vq* are used to match the axis current Id and the q-axis current Iq with the current command values Id* and Iq* respectively. A 2-phase/3-phase conversion circuit 7 converts the d-axis voltage command value Vd* and the q-axis voltage command value Vq* calculated at the current control circuit 6 to 3-phase voltage command values Vu*, Vv* and Vw*.

A duty command value calculating circuit 8 calculates PWM duty command values Du*, Dv* and Dw* for the individual phases based upon the 3-phase voltage command values Vu*, Vv* and Vw* resulting from the conversion performed at the 2-phase/3-phase conversion circuit 7. Namely, the duty is set at 50% when the current at the individual phases is 0 (A), the duty ratio is raised from 50% in correspondence to the extent to which the current at the individual phase rises from 0 (A) and the duty ratio is lowered from 50% in conformance to the extent to which the current at the individual phase becomes lower than 0 (A).

An intermediate wave generating circuit 9 compares the duty ratio corresponding to the PWM duty command values Du*, Dv* and Dw* calculated at the duty command value calculating circuit 8 with the positive and negative threshold values THU and THL of the PWM duty set by a threshold value setting circuit 15 which is to be described in detail later. If the duty ratio corresponding to the PWM duty command values Du*, Dv* and Dw* is higher than the positive-side threshold value THU, it sets the duty ratio to 100%, whereas if the duty ratio corresponding to the command values Du*, Dv* and Dw* is smaller than the negative-side threshold value THL, it sets the duty ratio to 0%. In addition, if the duty ratio corresponding to the command values Du*, Dv* and Dw* is equal to or lower than the positive-side threshold value THU and, at the same time, equal to or higher than the negative-side threshold value THL, it uses the duty ratio matching the command values Du*, Dv* and Dw* to generate PWM duty command values Du', Dv' and Dw' for the intermediate wave.

An inverter 10 engages in a switching operation by using switching elements corresponding to the individual phases in conformance to the PWM duty command values Du', Dv' and Dw' generated by the intermediate wave generating circuit 9, generates 3-phase AC voltages Vu, Vv and Vw by converting DC power from a battery 11 to AC power and applies the 3-phase AC voltages to the motor M. A current sensor 12 detects 3-phase AC currents Iu, Iv and Iw flowing through the motor M. A rotation sensor 13 outputs a pulse signal over an interval corresponding to a predetermined rotational angle of the motor M. A speed/phase calculating circuit 14 calculates the rotation speed ω and the phase θ of the motor M based upon the cycle of the pulse signal output from the rotation sensor 13 and the number of pulses counted per unit time.

The threshold value setting circuit 15 stores in memory a table of positive and negative threshold values of the PWM duty that vary in correspondence to the motor rotation speeds and the torque command value set in advance and calculates the threshold values THU and THL corresponding to the motor rotation speed (o calculated at the speed/phase calculating circuit 14 and the motor torque command value Tr* generated at the torque command value generating circuit 4 by referencing the table.

It is to be noted that among the control blocks shown in FIG. 9, the torque command value generating circuit 4, the current command value generating circuit 5, the current control circuit 6, the 2-phase/3-phase conversion circuit 7, the duty command value calculating circuit 8, the intermediate wave generating circuit 9, the speed/phase calculating circuit 14, the threshold value setting circuit 15 and a 3-phase/2-phase conversion circuit 16 are realized in the software of a single or a plurality of microcomputers.

Figure 10:
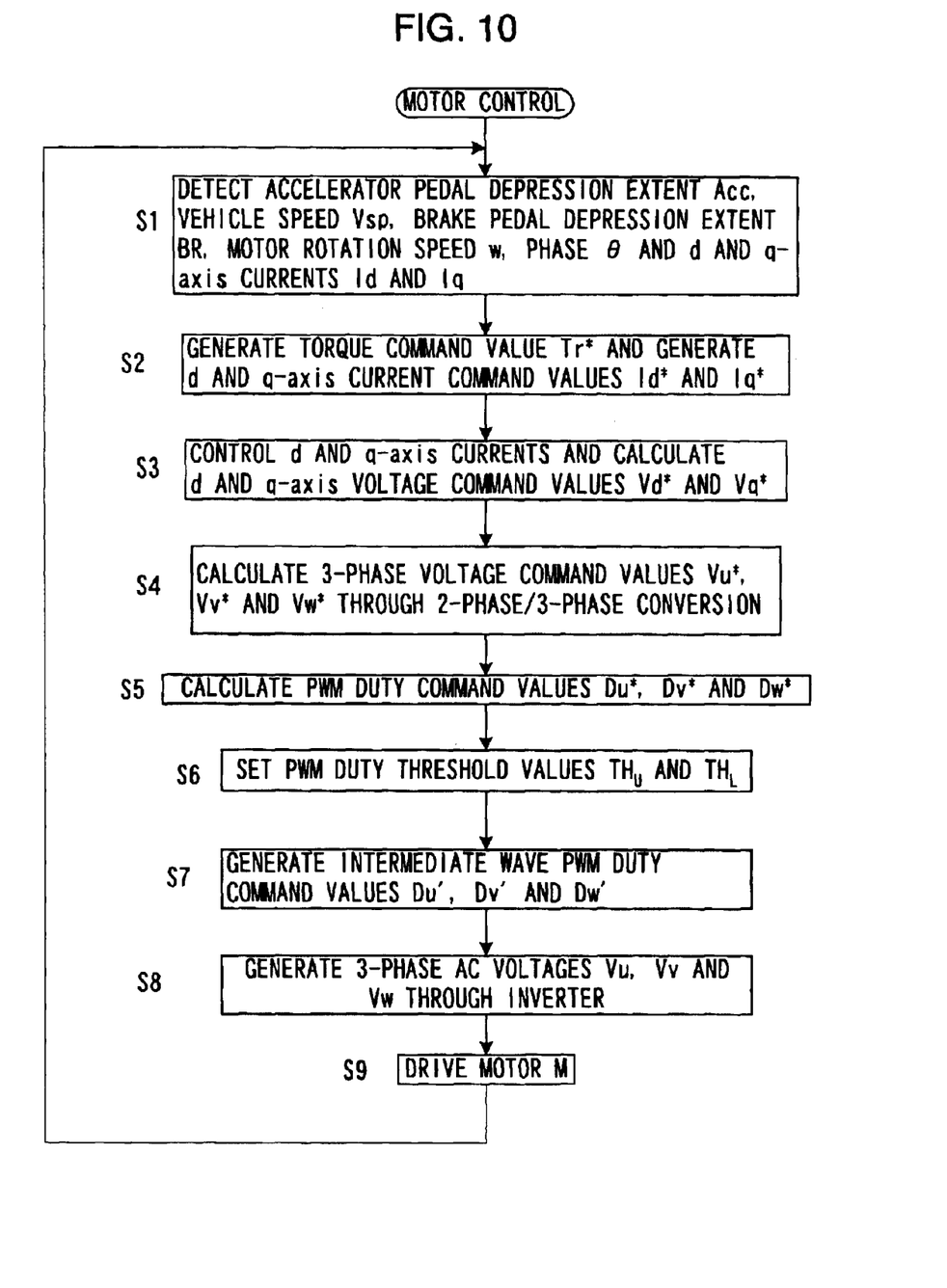
FIG. 10 presents a flowchart of the motor control program adopted in the embodiment.

FIG. 10 presents a flowchart of the motor control program achieved in the embodiment. Now, the processing executed in the motor control apparatus in the embodiment is explained in reference to the flowchart. While the main switch (not shown) of the electric car is on, this motor control program is repeatedly executed.

In step S1, the accelerator sensor 1, the vehicle speed sensor 2 and the brake sensor 3 respectively detect the accelerator pedal depression extent Acc, the vehicle speed Vsp and the brake pedal depression extent Br, the current sensor 12 and the 3-phase/2-phase conversion circuit 16 detect the d-axis current Id and the q-axis current Iq and the rotation sensor 13 and the speed/phase calculating circuit 14 detect the motor rotation speed ω and the rotational phase θ. In step S2, the torque command value generating circuit 4 calculates the torque command value Tr* corresponding to the accelerator pedal depression extent Acc, the vehicle speed Vsp and the brake pedal depression extent Br by referencing the table. In addition, current command value generating circuit 5 generates the d-axis current command value Id* and the q-axis current command value Iq* in correspondence to the torque command value Tr* by referencing the table.

In step S3, the current control circuit 6 ascertains the deviations (Id*-Id and Iq*-Iq) between the d-axis current command value Id* and the d-axis current Id and between the q-axis current command value Iq* and the q-axis current Iq and then calculates the d-axis voltage command value Vd* and the q-axis voltage command value Vq* through PI control implemented on the deviations. In the following step S4, the 2-phase/3-phase conversion circuit 7 converts the d-axis voltage command value Vd* and the q-axis voltage command value Vq* calculated in step S3 to the 3-phase voltage command values Vu*, Vv* and Vw*. In step S5, the duty command value calculating circuit 8 calculates the PWM duty command values Du*, Dv* and Dw* for the individual phases based upon the 3-phase voltage command values Vu*, Vv* and Vw* ascertained in step S4. Namely, the duty is set at 50% when the current at the individual phases is 0 (A), the duty ratio is raised from 50% in correspondence to the extent to which the currents at the individual phases rise from 0 (A) and the duty ratio is lowered from 50% in conformance to the extent to which the current becomes lower than 0 (A).

In step S6, the threshold value setting circuit 15 references the table to calculate the PWM duty threshold values THU and THL corresponding to the motor rotation speed ω and the torque command value Tr*. In step S7, the intermediate wave generating circuit 9 sets the duty ratio to 100% if the duty ratio corresponding to the PWM duty command values Du*, Dv* and Dw* is higher than the positive-side threshold value THU or sets the duty ratio to 0% if the duty ratio corresponding to the command values Du*, Dv* and Dw* is lower than the negative-side threshold value THL. If, on the other hand, the duty ratio corresponding to the command values Du*, Dv* and Dw* is equal to or lower than the positive-side threshold value THU and, at the same time, equal to or higher than the negative-side threshold value THL, it generates the PWM duty command values Du', Dv' and Dw' for generating the intermediate wave by using the duty ratio matching the command values Du*, Dv* and Dw*.

In step S8, the 3-phase AC voltages Vu, Vv and Vw are generated by converting the DC power to 3-phase AC power through the inverter 10 in conformance to the intermediate wave PWM duty command values Du', Dv' and Dw'. In step S9, the motor M is driven by applying the 3-phase AC voltages Vu, Vv and Vw generated in step S8 to the motor. Subsequently, the operation returns to step S1 and the processing in steps S1~S9 is repeatedly executed.

In the motor control apparatus achieved in the embodiment, when making a switch based upon the motor rotation speed and the torque command value between the sine wave voltage drive in which sine wave AC voltages are generated and applied to the motor and the rectangular wave voltage drive in which rectangular wave AC voltages are generated and applied to the motor, AC voltages manifesting as an intermediate wave achieved by combining the sine wave and the rectangular wave are generated and applied to the motor. As a result, the motor currents are allowed to change seamlessly even when the operation switches between the sine wave voltage drive and the rectangular wave voltage drive to minimize the fluctuation of the motor rotation speed and the fluctuation of the torque at the time of the switch, and, as a result, a smooth switching operation is achieved. Namely, even if a fluctuation of the motor current, the motor rotation speed or the source voltage occurs at the time of a switch between the sine wave voltage drive and the rectangular wave voltage drive, no trailing delay is induced by the fluctuation. In addition, since the inverter does not engage in any switching operation during the control period over which control is achieved by using the rectangular wave component in the intermediate wave, no switching loss occurs during this period to improve the power conversion efficiency in the inverter and to prevent a temperature increase at the switching elements.

In the motor control apparatus achieved in the embodiment described above, in the intermediate wave generated by combining the sine wave and the rectangular wave, the rectangular wave component is set to 0 over a specific range of the motor rotation speed and the torque command value (over the range ① in FIG. 3). In addition, a sine wave and a rectangular wave are combined so that the rectangular wave component within the synthesized intermediate wave increases as the motor rotation speed increases and also as the motor torque command value increases while the motor rotation speed and the torque command value are outside the specific range (over the range ② in FIG. 3) and the inverter is controlled by using the synthesized intermediate wave thus generated to apply AC voltages with the intermediate waveform to the motor. As a result, the motor currents are allowed to change seamlessly even when the operation switches between the sine wave voltage drive and the rectangular wave voltage drive to minimize the fluctuation of the motor rotation speed and the fluctuation of the torque at the time of the switch and consequently, a smooth switching operation is achieved. In addition, since the inverter does not engage in any switching operation during the control period over which control is achieved by using the rectangular wave component in the intermediate wave, no switching loss occurs during this period to improve the power conversion efficiency in the inverter and to prevent a temperature increase at the switching elements. Furthermore, the sine wave drive range and the range over which drive should be achieved by using the rectangular wave or the intermediate wave can be set freely, and thus, the intermediate wave drive can be implemented even over a range with a relatively low motor rotation speed and a range with a low motor current level to realize advantages of the rectangular wave drive even over a range in which control cannot be implemented by using a full rectangular wave.

Furthermore, the motor control apparatus achieved in the embodiment, which includes a circuit that implements PWM control based upon the modulation triangular-wave voltage and the sine-wave control voltage, controls the inverter by calculating the PWM control duty command values and generates equivalent sine wave AC voltages to be applied to the motor and a circuit that generates the rectangular wave AC voltages to be applied to the motor by controlling the inverter, engages in the following control. Namely, a PWM control duty threshold value is set in correspondence to the motor torque command value and the motor rotation speed, and equivalent sine wave AC voltages are applied to the motor by the sine wave voltage generating circuit if the PWM control duty command value is equal to or lower than the threshold value, whereas rectangular AC voltages are applied to the motor by the rectangular wave voltage generating circuit if the PWM control duty command value exceeds the threshold value. As a result, the motor currents are allowed to change seamlessly even when the operation switches between the sine wave PWM control and the rectangular wave control to minimize the fluctuation of the motor rotation speed and the fluctuation of the torque at the time of the switch and, consequently, a smooth switching operation is achieved. In addition, since the inverter does not engage in any switching operation during the control period over which control is achieved by using the rectangular wave component in the intermediate wave, no switching loss occurs during this period to improve the power conversion efficiency in the inverter and to prevent a temperature increase at the switching elements. Moreover, the sine wave PWM control range and the range over which control should be implemented by using the rectangular wave or the intermediate wave can be set freely, and thus, the intermediate wave drive can be implemented even over a range with a relatively low motor rotation speed and a range with a low motor current level to realize advantages of the rectangular wave drive even over a range in which control cannot be implemented by using a full rectangular wave.

The above described embodiment is an example, and various modifications can be made without departing from the spirit and scope of the invention. For instance, while an explanation is given above in reference to the embodiment on an example in which the present invention is adopted in conjunction with a motor mounted in an electric car, the present invention maybe adopted in conjunction with all types of motors used in non-automotive applications as well as automotive applications such as hybrid vehicles.

In addition, while the motor control apparatus achieved in the embodiment described above drives the motor with the intermediate wave voltages with a synthesized waveform achieved by combining the sine wave and the rectangular wave over the range (the range ② in FIG. 3) in which the motor rotation speed is high and the motor torque command value is also high, the motor may instead be driven with the intermediate wave voltages with a synthesized waveform achieved by combining the sine wave and the rectangular wave over the range (the range ① in FIG. 3) in which the motor rotation speed is low and the motor torque command value is also low. In the latter case, the sine wave component in the intermediate wave should be increased as the motor rotation speed decreases and also as the torque command value becomes lower.

In addition, while the motor control apparatus in the embodiment employs a vector control inverter in the explanation given above, the present invention may be adopted in conjunction with a sine wave PWM control inverter which does not implement vector control. Furthermore, a sine wave control other than a sine wave PWM control may be applied to a motor control apparatus in the present invention.

The disclosure of the following priority application is herein incorporated by reference: Japanese Patent Application No. 2002-40269 filed Feb. 18, 2002

What is claimed is:

1. A motor control apparatus comprising:

a sine wave voltage drive device that generates a sine wave AC voltage and applies the sine wave AC voltage to a motor;

a rectangular wave voltage drive device that generates a rectangular wave AC voltage and applies the rectangular wave AC voltage to the motor;

a speed detection device that detects a rotation speed of the motor;

a control switching device that switches to either the sine wave voltage drive device or the rectangular wave voltage drive device based upon the motor rotation speed detected by the speed detection device and a motor torque command value; and an intermediate wave voltage drive device that generates an AC voltage forming an intermediate wave achieved by combining a sine wave and a rectangular wave and applies the intermediate wave AC voltage to the motor when a switch between the sine wave voltage drive device and the rectangular wave voltage drive device is effected by the control switching device.

2. A motor control apparatus according to claim 1, wherein:

the intermediate wave voltage drive device determines a ratio of a rectangular wave component contained in the intermediate wave based upon the motor rotation speed detected by the speed detection device and the motor torque command value.

3. A motor control apparatus according to claim 1, wherein:

the intermediate wave voltage drive device generates an intermediate wave containing a larger rectangular wave component as the motor rotation speed increases and also as the motor torque command value becomes higher.

4. A motor control apparatus comprising:

a speed detection device that detects a rotation speed of a motor;

an intermediate wave synthesizing device that generates an intermediate wave by combining a sine wave and a rectangular wave so as to set a rectangular wave component contained in the intermediate wave to 0 when the motor rotation speed and a motor torque command value are within a specific range and to increase the rectangular wave component contained in the intermediate wave as the motor rotation speed increases and also as the motor torque command value becomes higher when the motor rotation speed and the motor torque command value are outside the specific range; and a drive device that controls an inverter based upon the intermediate wave synthesized at the intermediate wave synthesizing device and applies and AC voltage achieving a waveform of the intermediate wave to the motor.

5. A motor control apparatus comprising:

a sine wave voltage generating device that implements PWM control based upon a modulation triangular-wave voltage and a sine-wave control voltage, controls an inverter by calculating a PWM control duty command value and generates an equivalent sine wave AC voltage to be applied to a motor;

a rectangular wave voltage generating device that generates a rectangular wave AC voltage to be applied to the motor by controlling the inverter;

a speed detection device that detects a rotation speed of the motor;

a threshold value setting device that sets a PWM control duty threshold value in correspondence to the rotation speed detected by the speed detection device and a motor torque command value; and a control switching device that implements control so as to apply the equivalent sine wave AC voltage generated by the sine wave voltage generating device to the motor when the PWM control duty command value does not exceed the threshold value and to apply the rectangular wave AC voltage generated by the rectangular wave voltage generating device to the motor when the PWM control duty command value exceeds the threshold value.

6. A motor control apparatus according to claim 5, wherein:

the threshold value setting device sets the duty threshold to a maximum value so as to apply the equivalent sine wave AC voltage generated by the sine wave voltage generating device to the motor when the motor rotation speed and the motor torque command value are within a specific range.

7. A motor control apparatus according to claim 5, wherein:

the threshold value setting device lowers the duty threshold value as the motor rotation speed becomes higher and also as the motor torque command value becomes higher when the motor rotation speed and the motor torque command value are outside the specific range.

8. A motor control apparatus comprising:

a sine wave voltage drive means for generating a sine wave AC voltage and applying the sine wave AC voltage to a motor;

a rectangular wave voltage drive means for generating a rectangular wave AC voltage and applying the rectangular wave AC voltage to the motor;

a speed detection means for detecting a rotation speed of the motor;

a control switching means for switching to either the sine wave voltage drive means or the rectangular wave voltage drive means based upon the motor rotation speed detected by the speed detection means and a motor torque command value; and an intermediate wave voltage drive means for generating an AC voltage that forms an intermediate wave achieved by combining a sine wave and a rectangular wave and applying the intermediate wave AC voltage to the motor when a switch between the sine wave voltage drive means and the rectangular wave voltage drive means is effected by the control switching means.

9. A motor control apparatus comprising:

a speed detection means for detecting a rotation speed of a motor;

an intermediate wave synthesizing means for generating an intermediate wave by combining a sine wave and a rectangular wave so as to set a rectangular wave component contained in the intermediate wave to 0 when the motor rotation speed and a motor torque command value are within a specific range and to increase the rectangular wave component contained in the intermediate wave as the motor rotation speed increases and also as the motor torque command value becomes higher when the motor rotation speed and the motor torque command value are outside the specific range; and a drive means for controlling an inverter based upon the intermediate wave synthesized at the intermediate wave synthesizing means and applying an AC voltage achieving a waveform of the intermediate wave to the motor.

10. A motor control apparatus comprising:

a sine wave voltage generation means for implementing PWM control based upon a modulation triangular-wave voltage and a sine-wave control voltage, controlling an inverter by calculating a PWM control duty command value and generating an equivalent sine wave AC voltage to be applied to a motor;

a rectangular wave voltage generation means for generating a rectangular wave AC voltage to be applied to the motor by controlling the inverter;

a speed detection means for detecting a rotation speed of the motor;

a threshold value setting means for setting a PWM control duty threshold value in correspondence to the rotation speed detected by the speed detection means and a motor torque command value; and a control switching means for implementing control so as to apply the equivalent sine wave AC voltage generated by the sine wave voltage generation means to the motor when the PWM control duty command value is equal to or lower than the threshold value and to apply the rectangular wave AC voltage generated by the rectangular wave voltage generation means to the motor when the PWM control duty command value exceeds the threshold value.

11. A method of controlling a motor comprising:

applying one of a sine wave AC voltage and a rectangular wave AC voltage to a motor;

generating an AC voltage forming an intermediate wave by combining a sine wave and a rectangular wave; and applying the AC voltage forming the intermediate wave to the motor when a switch between the sine wave AC voltage and the rectangular wave AC voltage to be applied to the motor occurs.

* * * * *